United States Patent

[11] 3,593,062

[72] Inventor Frederic R. Quinn
 Red Hook, N.Y.
[21] Appl. No. 2,569
[22] Filed Jan. 13, 1970
[45] Patented July 13, 1971
[73] Assignee Zyrotron Industries, Inc.
 South Hackensack, N.J.

[54] CONTROL APPARATUS RESPONSIVE TO EXCESS CURRENT UTILIZING TEMPERATURE SENSITIVE RESISTORS
 14 Claims, 3 Drawing Figs.

[52] U.S. Cl. .................................................. 317/13,
 317/42, 317/46, 307/252
[51] Int. Cl. ...................................................... H02h 5/04,
 H02h 3/08
[50] Field of Search ............................................ 317/41, 42,
 40, 46, 13.3, 33, 148.5 B; 307/227, 332, 252.72, 252.73

[56] References Cited
 UNITED STATES PATENTS
 3,237,030 2/1966 Coburn ..................... 307/252.73 X
 3,277,362 10/1966 Elliott ........................ 307/252.73 X
 3,366,843 1/1968 Evalds ........................ 317/42 X

*Primary Examiner*—J. D. Miller
*Assistant Examiner*—Harvey Fendelman
*Attorney*—Irving Seidman ABSTRACT: A control apparatus for controlling the operation of an associated device which includes a first switch comprising a pair of silicon controlled rectifiers connected in inverse parallel relationship between a load and a source of power. The silicon controlled rectifiers or SCR's are gated on by a gate signal from a gate signal generator which is connected to the first switch SCR's by a control SCR. Conduction of the control SCR is regulated by a selectively operable device which, therefore, controls the operation of the first switch to connect power to the load. In practice, a second switch is serially connected to the first switch and similarly comprises a pair of SCR's connected in inverse parallel relationship. The conduction of the SCR's comprising the second switch are controlled by a condition responsive device which is operable to cause these SCR's to stop conducting in response to the occurrence of a preselected event. After such event, the selectively operable device must be actuated to close the first switch.

3,593,062

INVENTOR.
FREDERIC R. QUINN

BY
*Irving Seidman*
Attorney

INVENTOR
FREDERIC R. QUINN
By Irving Seidman
Attorney

CONTROL APPARATUS RESPONSIVE TO EXCESS CURRENT UTILIZING TEMPERATURE SENSITIVE RESISTORS

This invention relates to control apparatus for controlling the operation of a load device and, more particularly, pertains to a load apparatus which must be selectively actuated after the occurrence of a preselected event to connect power to the load device.

Most power control devices are connected directly in the power line adjacent the source of power and require an operator to be present at this location in order to restore power to a load after an overload condition, for example. Additionally, such devices are usually electromechanical in nature and are extremely bulky, thereby requiring sufficient space to house such equipment, are unreliable in operation and subject to such disadvantages as arcing, pitting of contacts, etc. Moreover, such devices are expensive and are subject to continuous maintenance.

Accordingly, an object of this invention is to provide an improved control apparatus for controlling the operation of an associated device.

A more specific object of this invention is to provide an inexpensive and reliable control apparatus which is extremely compact, thereby requiring only a minimum of space.

Another object of this invention resides in the novel details of circuitry which provide a control apparatus of the type described which may be selectively operated from a location which is remote from the source of power.

Accordingly, a control apparatus constructed in accordance with the present invention for controlling the operation of an associated device comprises first switching means for connecting the associated device with a source of power; said first switching means comprising a first and a second variable impedance each having an input, an output and a control electrode and each being operable to establish a current path between the input and output electrodes in response to a gating signal applied between the associated input and control electrodes. First lead means connects the input electrodes of the first and second variable impedance means with the respective output electrodes of the second and first variable impedance means. A third variable impedance mans is provided which has an input, an output and a control electrode and is similarly operable to establish a current path between the input and output electrodes in response to an operate signal applied between the control and input electrodes. Gating signal means for generating the gating signal is provided and lead means connects the third variable impedance in series with the gating signal generating means between the input and control electrodes of the first and second variable impedance means. Selectively operable actuating means for applying the operate signal between the control and input electrodes of the third variable impedance means is provided to render the third variable impedance means conductive whereby gating signals are applied between the respective input and control electrodes of the first and second variable impedance means.

Other features and advantages of the present invention will become more apparent from a consideration of the following detailed description, when taken in conjunction with the accompanying drawings, in which.

In the description which follows, it will be assumed that the control apparatus of the present invention is utilized for controlling the operation of a three-phase motor. However, it is emphasized that this example is for illustrative purposes only and is not to be interpreted as being a limitation of the present invention. That is, the control apparatus constructed in accordance with the present invention may be utilized to control the operation of any associated device.

Figure 1:
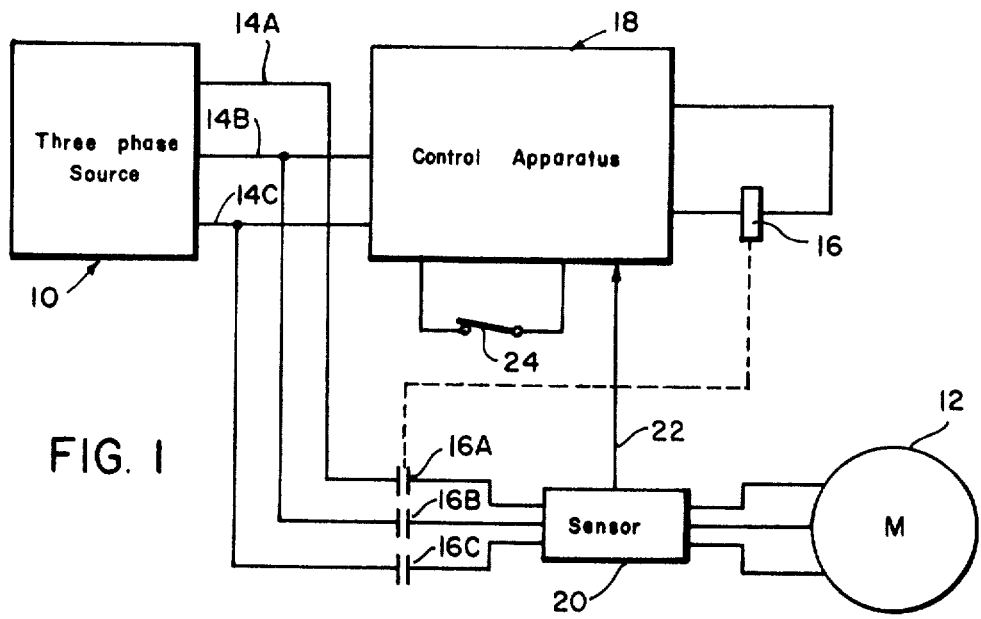
FIG. 1 is a block wiring diagram of a system utilizing the control apparatus constructed in accordance with the present invention.

In the illustrative example under consideration, as shown in FIG. 1, a three-phase source of energy 10 is connected to a load device such as a motor 12 by the respective leads 14A, 14B and 14C. Serially connected in each one of the leads 14A—14C is a respective pair of normally open contacts 16A, 16B and 16C. Accordingly, in order to energize the motor 12, the contacts 16A—16C must be closed. The contacts 16A—16C are controlled by a relay winding 16 which is connected to a control apparatus 18 constructed according to the present invention. The control apparatus 18 is connected to one phase of the three-phase source of energy 10 via the leads 14B and 14C. Thus, when the control apparatus 18 is actuated to cause the relay winding 16 to be energized, the contacts 16A—16C close thereby to energize the motor. Additionally, the leads 14A—14C are connected to a sensor 20 which monitors the current flowing in each one of the leads. If the current in any one of the leads 14A—14C exceeds a predetermined safety value, the sensor 20 is operable via a lead 22 to disable the control apparatus 18 thereby removing power from the relay winding 16 which causes the contacts 16A—16C to open thereby deenergizing the motor 12. The control apparatus 18 includes a manually operable switch 24 to reset the control apparatus after it has been disabled due to an overload condition.

Figure 2:
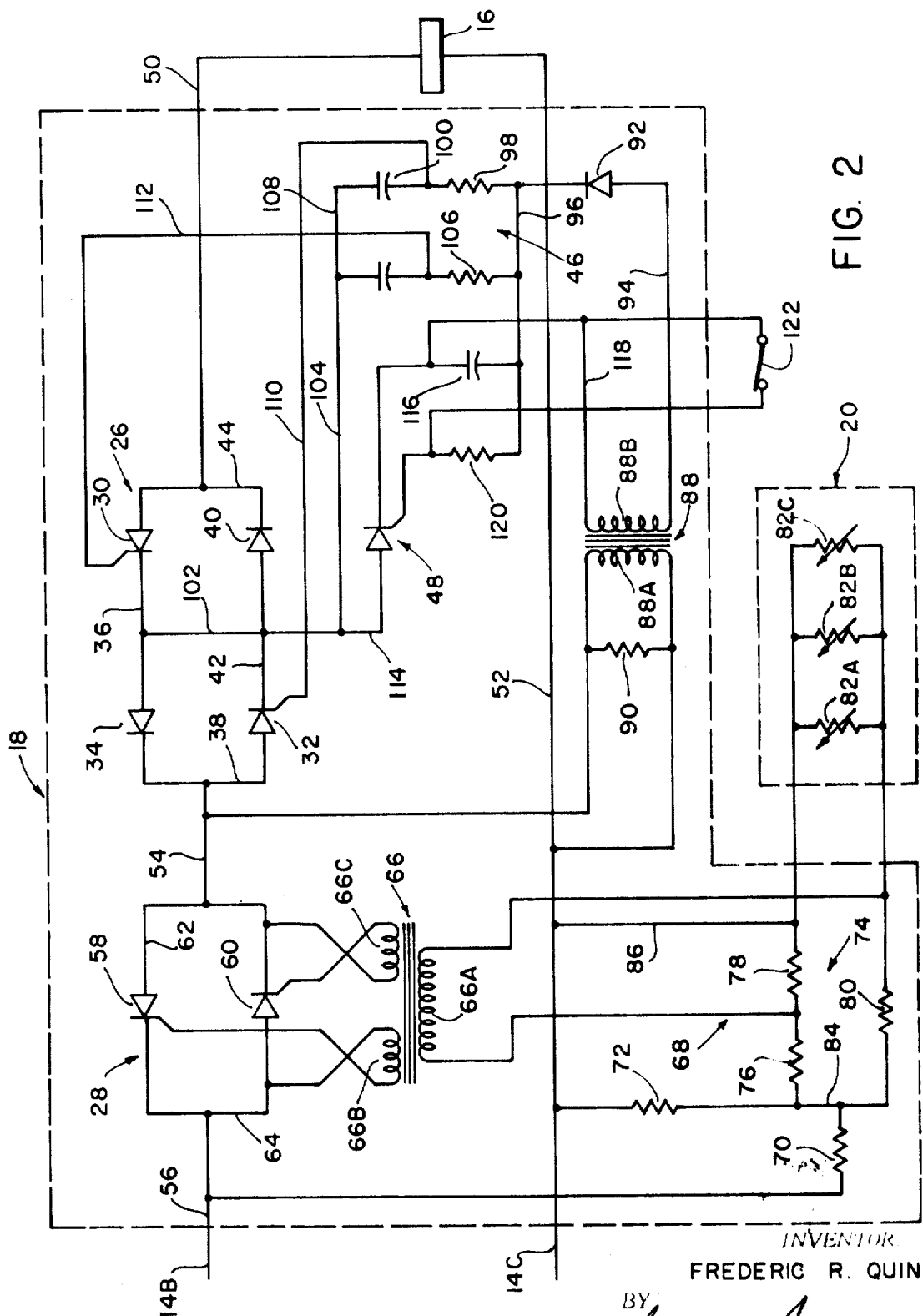
FIG. 2 is a schematic circuit wiring diagram of the control apparatus of the present invention.

More specifically, the control apparatus 18 is illustrated in FIG. 2 and includes a first switch designated generally by the reference numeral 26 and a second switch designated generally by the reference numeral 28. The switch 28 is responsive to the sensor 20 and is operable to open if an overload condition exists. On the other hand, the switch 26 is operable to maintain the relay winding 16 deenergized until the manually operable switch 24 has been actuated.

As shown in FIG. 2, switches 28 and 26 and the relay winding 16 are connected in series between the leads 14B and 14C. It is emphasized that the relay winding 16 is only for illustrative purposes as the relay winding 16 may be replaced by any load device so that the control apparatus 18 may control the apparatus of any associated device.

Switch 26 includes silicon controlled rectifiers or SCR's 30 and 32 each having an input or cathode electrode, an output or anode electrode, and a control or gate electrode. The SCR's are variable impedance devices which are operable to establish a current path between the cathode and anode electrodes when a proper gating signal is applied between the gate and cathode electrodes of the device. The SCR's 30 and 32 are connected in inverse parallel relationship. More specifically, the cathode electrode of the SCR 30 is connected to the anode electrode of a diode 34 by a lead 36. The cathode electrode of the diode 34 is connected to the anode electrode of the SCR 32 by a lead 38. The cathode electrode of the SCR 32 is connected to the anode electrode of a diode 40 by a lead 42. The cathode electrode of the diode 40 is connected back to the anode electrode of the SCR 30 by a lead 44. The diode 34 is polarized to conduct current in the same direction as the SCR 30 and the diode 40 is polarized to conduct current in the same direction as the SCR 32. Accordingly, the diodes 40 and 34 prevent leakage currents in the reverse direction when the switch 26 is in the open condition (i.e., when the SCR's are nonconducting).

The gate and cathode electrodes of the SCR's 30 and 32 are connected to a gate signal generator, designated generally by the reference numeral 46 through another SCR 48. The SCR 48 may be selectively actuated to connect the gate signal generator 46 with the SCR's 30 and 32 thereby to fire the SCR's and close the switch 26, as noted in greater detail hereinbelow.

The relay winding or load 16 is connected between lead 44 of the switch 26 and the input lead 14C via the leads 50 and 52, respectively. The lead 38 is connected to the second switch 28 by a lead 54. The opposite end of the switch 28 is connected to the input lead 14B by a lead 56.

More specifically, the switch 28 comprises a pair of SCR's 58 and 60 which are connected in inverse parallel relationship. That is, the anode electrode of the SCR 58 is connected to the cathode electrode of the SCR 60 by a lead 62. The cathode electrode of the SCR 58 is connected to the anode electrode of the SCR 60 by a lead 64. The gate and cathode electrodes of the SCR's 58 and 60 are connected to respective secondary windings 66B and 66C of a pulse transformer 66. The pulse transformer 66 forms a part of a signal device designated generally by the reference numeral 68 which is adapted to apply a gate signal between the gate and cathode electrodes of the respective SCR's 58 and 60 to fire the SCR's and effectively close the switch 28.

More specifically, the signal device 68 includes a voltage divider comprising a resistor 70 and a resistor 72 connected in series between the leads 56 and 52. Connected between the junction of the resistors 70 and 72 and the lead 52 is a bridge circuit 74. The bridge circuit 74 includes series connected resistors or impedances 76 and 78 which are connected in parallel with the series circuit of an impedance or resistor 80 and variable impedances 82A, 82B and 82C which are connected in parallel. The bridge circuit 74 is connected to the junction of the voltage divider resistors 70 and 72 at the junction of the resistors or impedances 76 and 80 by a lead 84. Similarly, the lead 52 is connected to the circuit 74 at the junction of the resistor or impedance 78 and the variable impedances 82A—82C by a lead 86. The primary winding 66A of the pulse transformer 66 is connected across the output of the bridge circuit 74 between the resistors 76 and 78 at one end and the resistor 80 and the variable resistors 82A—82C at the other end.

In practice, the values of the resistors 82A—82C are chosen so that a current will flow in the primary winding of the transformer 66 such that a gating signal will be applied to the gate electrodes of the SCR's 58 and 60 via the secondary windings 66B and 66C of the transformer 66 so that these respective SCR's will fire thereby effectively closing the switch 28. Moreover, the variable resistors 82A—82C are part of the sensor 20 shown in FIG. 1 and are temperature sensitive resistors or impedances whose value changes in accordance with the ambient temperature. It is to be noted that each one of the resistors 82A—82C is associated with a different phase of the source of power. (Of course, if a single phase source of power is utilized, only one resistor or sensor will be needed.) A separate heater for each one of the respective variable resistors is provided and each heater is connected in series with the particular phase. Thus, if there is an overload condition in the "A" phase, an excessive current will flow through the lead 14A thereby raising the temperature of the heater in that phase. Accordingly, the ambient temperature surrounding the variable resistor 82A will change thereby changing the impedance of this variable resistor. The same comments apply for the variable resistors 82B and 82C which will likewise change the value of their resistance if an overload condition occurs in the phase monitored by these variable resistors.

As noted above, the value of the variable resistors 82A—82C are chosen so that initially the SCR's 58 and 70 will conduct current. However, if an overload condition occurs in any one of the phases, as noted above, the particular variable resistor associated with that phase will change. When the value of any one of the variable resistors changes the balance of the bridge circuit 74 will be upset. More specifically, the values of the elements comprising the bridge circuit 74 are chosen so that current normally flows in winding 66A from left to right. However, when any one of the variable resistors 82A—82C changes a small reverse current will flow through the pulse transformer primary winding 66A. That is, current will flow through the winding 66A from right to left. This small reverse current will be transmitted to the gate electrodes of the SCR's 58 and 60 via the secondary windings 66B and 66C, respectively, thereby rendering the SCR's nonconductive. Hence, the switch 28 will effectively open thereby removing energy from the remainder of the circuit. Summarizing the operation of the circuit thus far described, the signal device 68 applies a signal to the SCR's 58 and 60 to cause the SCR's to fire while the variable resistors 82A—82C may be thought of as means which controls the operation of the signal device 68 and which is effective to render the SCR's 58 and 60 nonconductive when an overload condition occurs.

As noted above, the SCR's 30 and 32 of the switch 26 are connected to a gate signal generator 46 through an SCR 48. More specifically, the gate signal generator includes saturable reactor 88 the primary winding 88A of which is connected between the leads 54 and 52. A resistor 90 is connected across the primary winding 88A. One end of the secondary winding 88B of the reactor 88 is connected to the anode electrode of a diode 92 by a lead 94. The cathode electrode of the diode 92 is connected to a common lead 96. On end of a series circuit comprising a resistor 98 and a capacitor 100 is connected to the lead 96; the other end of the series circuit is connected, by a lead 104, to a lead 102 which connects together the cathode electrodes of the SCR's 30 and 32. Similarly, the series circuit of a resistor 106 and a capacitor 108 is connected in parallel with the series circuit of the resistor 98 and the capacitor 100. The junction of the resistor 98 and the capacitor 100 is connected to the gate electrode of the SCR 32 by a lead 110. Similarly, the junction of the resistor 106 and the capacitor 108 is connected to the gate electrode of the SCR 30 by a lead 112. The anode electrode of the SCR 48 is connected to the junction of the leads 102 and 104 by a lead 114. The cathode electrode of the SCR 48 is connected to the common lead 96 through a capacitor 116. The other end of the secondary winding 88B of the reactor 88 is connected to the junction of the cathode electrode of the SCR 48 and the capacitor 116 by a lead 118. A resistor 120 is connected between the common lead 96 and the gate electrode of the SCR 48. Additionally, normally closed contacts of a switch 122 are connected between the cathode and gate electrodes of the SCR 48. The resistor 120 and the capacitor 116 provide a biasing means for biasing the SCR 48 into conduction when the switch 122 is selectively actuated to remove the short across the cathode and gate electrodes of the SCR.

In operation, the three-phase source 10 is connected to the leads 14A—14C. However, power is not applied to the motor 12 at this time since the contacts 16A—16C are open at this time. Assuming normal conditions exist, the variable resistors 82A—82C in the sensor 20 will be at their normal operating values so that a signal will be applied to the gate electrodes of the SCR's 58 and 60 in the control apparatus 18 to cause these SCR's to conduct. Accordingly, current will flow through the primary winding 88A of the reactor 88. However, since no gating pulse will be applied to the SCR 48 at this time, no gating signals will be applied to the SCR's 30 and 32 comprising the switch 26 so that these SCR's will still remain nonconductive. However, it is to be noted that at this point current will be flowing through the primary winding 88A of the reactor 88.

When it is desired to energize the relay winding 16 to close the contacts 16A—16C to apply energy to the motor 12, the switch 122 of FIG. 2 (which corresponds to the switch 24 of FIG. 1) is manually operated to the open condition. Thus, the capacitor 116 will discharge thereby rendering the SCR 48 conductive. After the SCR 48 has been fired, the switch 122 may be released since it will not have any effect on the conduction of the SCR 48 as is conventional. A complete circuit will now exist from the secondary winding 88B through the lead 94, diode 92, lead 96, the respective resistors 98 and 106 and the corresponding leads 110 and 112 to the gate electrodes of the respective SCR's 30 and 32 and from the cathode electrodes of these SCR's through the SCR 48 and the lead 118 to the secondary winding 88B thereby causing the SCR's 30 and 32 to fire. It is to be noted that the capacitors 100 and 108 of the gate signal generator 46 are operable to cause the SCR's 30 and 32 to quickly fire. Accordingly, current will now flow to the relay winding 16 which causes the contacts 16A—16C to close thereby energizing the motor 12.

If an overload condition exists, as noted above, the resistance of one or more of the variable resistors 82A—82C in the bridge circuit 74 will change thereby causing the SCR's 58 and 60 comprising the second switch 28 to become nonconductive. Accordingly, power will be removed from the switch 26 and the relay winding 16. Hence, the contacts 16A—16C will open thereby deenergizing the motor 12. When the power is removed from the SCR 48, it is to be noted that this silicon controlled rectifier can only be rendered conductive if current flows through the windings of the reactor 88 and the switch 122 is actuated. Hence, no power can be applied to the relay winding 16 until the switch 122 has again been actuated. Moreover, as a feature of the present invention, it is to be noted that the switch 122 may be located at a point remote from the control apparatus 18 so that the operator of the device does not have to return to the control apparatus each time he wishes to reset the circuit (i.e., to operate the switch 122). An additional feature of the present invention is achieved by utilizing the thermal overload sensor disclosed in my copending application noted above. Thus, it is to be noted that the imbalance of the bridge circuit 74 will remain until the particular resistor 82A—82C has returned to its normal value. Thus, if an extreme overload condition occurs, even if the switch 122 is operated, the relay 16 will not be energized since the switch 28 will remain in the open position corresponding to nonconduction of the SCR's 58 and 60 until the heater associated with the changed value resistor 82A—82C has cooled to the extent that the resistor returns to its nominal value.

Figure 3:
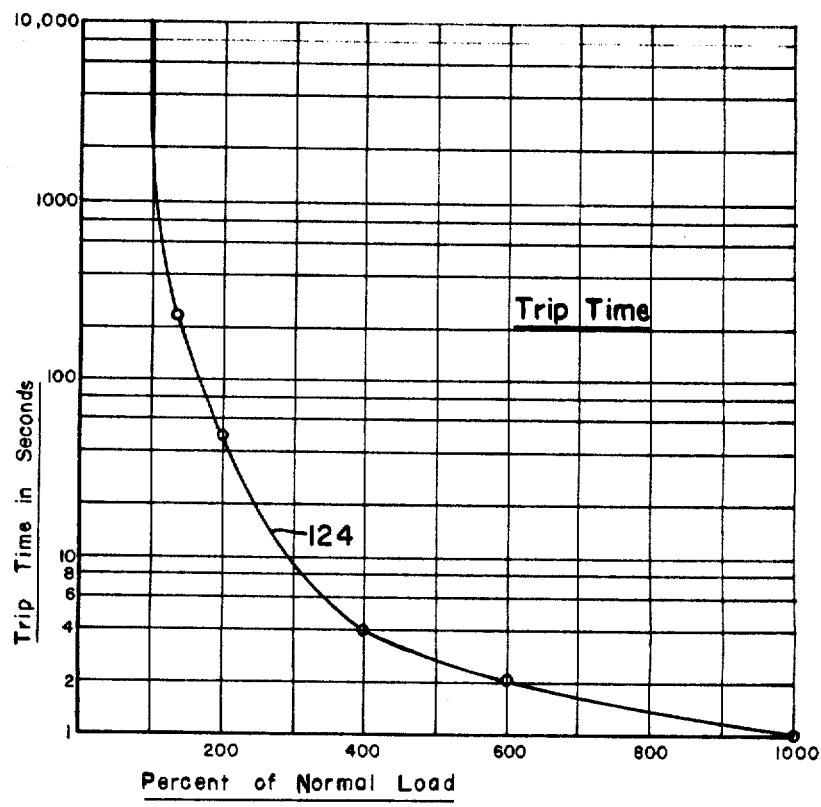
FIG. 3 illustrates the relationship of the operate time of the control apparatus of the present invention as a function of the percent of overload drawn by the associated device.

Moreover, it is to be noted that by utilizing the sensor described in my copending application the time to operate the present control apparatus may be very short for high overload conditions. Thus, FIG. 3 illustrates a curve 124 which shows the time that it takes the control apparatus to remove energy from the relay winding 16 as a function of the percent of the normal load.

While a selectively operable manual switch 122 has been shown herein, to reset the control apparatus 18, it is to be noted that this is for illustrative purposes only and is not to be interpreted as being a limitation of the present invention. That is, any type of device may be used instead of the pushbutton 122 to reset the apparatus such as a relay and the like.

Accordingly, a control apparatus for controlling the operation of associated equipment has been shown and described herein which is inexpensive to produce and reliable in operation.

While a preferred embodiment of the invention has been shown and described herein, it will become obvious that numerous omissions, changes and additions may be made in such embodiment without departing from the spirit and scope of the present invention.

What I claim is:

1. A control apparatus for controlling the operation of an associated device comprising first switching means for connecting the associated device with a source of power; said first switching means comprising a first and a second variable impedance each having an input, an output, and a control electrode and each being operable to establish a current path between the input and output electrodes in response to a gating signal applied between the associated input and control electrodes; and first lead means for connecting the input electrodes of said first and second variable impedance means with the respective output electrodes of said second and first variable impedance means; a common third variable impedance means having an input, an output and a control electrode and being operable to establish a current path between said input and output electrodes in response to an operate signal applied between the control and input electrodes thereof; gating signal generating means for generating a gating signal; second lead means for connecting said common third variable impedance means in series with said gating signal generating means between the input and control electrodes of both of said first and second variable impedance means; and selectively operable actuating means for applying an operate signal between said control and input electrodes of said common third variable impedance means to render said third variable impedance means conductive whereby gating signals are applied between the respective input and control electrodes of said first and second variable impedance means.

2. A control apparatus as in claim 1 and second switching means connected in series with said first switching means between the associated device and the source of power, operable between a first state and a second state in response to a preselected condition, one of said first and second states corresponding to a closed condition of said second switching means and the other of said first and second states corresponding to an open condition of said second switching means.

3. A control apparatus as in claim 2, in which said second switching means comprises fourth and fifth variable impedance means each having an input, an output and a control electrode and each being operable to establish a current path between the input and output electrodes in response to a gating signal received between the input and control electrodes; lead means for connecting the input electrodes of said fourth and fifth variable impedance means to the respective output electrodes of the fifth and fourth variable impedance means; signal means for applying a gating signal between the control and input electrodes of said fourth and fifth variable impedance means; said signal means comprising operating means for controlling the operation of said signal means in response to the occurrence of a preselected condition.

4. A control apparatus as in claim 3, in which said signal means comprises a bridge network having four arms and an output, one of said arms comprising said operating means, said operating means normally maintaining said bridge in a balanced condition, output means connected between said bridge output and the control and input electrodes of said fourth and fifth variable impedance means, said operating means being operable to unbalance said bridge in response to said preselected condition to render said fourth and fifth variable impedance means nonconductive corresponding to the open state of said second switching means.

5. A control apparatus as in claim 4, in which said operating means comprises a thermal sensor having an impedance which changes rapidly at a preselected temperature, whereby said bridge becomes unbalanced.

6. A control apparatus as in claim 4, in which said fourth and fifth variable impedance means are silicon controlled rectifiers having cathode, anode and gate electrodes, wherein said input electrode corresponds to the cathode electrode, said output electrode corresponds to the anode electrode, and said control electrode corresponds to said gate electrode, said silicon controlled rectifiers being connected in inverse parallel relationship.

7. A control apparatus as in claim 1, in which said first and second variable impedance means comprise silicon controlled rectifiers each having an anode, cathode and gate electrodes wherein said input electrode corresponds to said cathode electrode, said output electrode corresponds to said anode electrode and said control electrode corresponds to said gait electrode, said first lead means connecting said silicon controlled rectifiers in inverse parallel relationship, and a respective unidirectional current conducting means in series with each silicon controlled rectifier to prevent leakage currents from flowing therethrough.

8. A control apparatus as in claim 1, in which said third variable impedance means comprises a silicon controlled rectifier having an anode electrode corresponding to said output electrode, a cathode electrode corresponding to said input electrode and a gate electrode corresponding to said control electrode.

9. A control apparatus as in claim 8, in which said actuating means includes biasing means for producing said operate signal and shorting means normally shorting together said gate and cathode electrodes of said third silicon controlled rectifier and being manually operable to break said connection between said gate and cathode electrodes of said third silicon controlled rectifier and permit said biasing means to apply said operate signal to said third silicon controlled rectifier to render the same conductive.

10. A control apparatus for controlling the operation of an associated device comprising first and second switch means connected in series between a source of energy and the associated device and each being operable between an open and a closed state, condition responsive means for controlling the operation of said second switch means to move said first switch means between said closed and open states in response to the occurrence of a preselected condition, gating signal means for applying a gating signal to said first switch means to move said second switch means to the closed state, control means between said gating signal means and said first switch means for connecting said gating signal to said first switch means, in response to a biasing signal, and selectively operable biasing signal means for applying said biasing signal to said control means.

11. A control apparatus as in claim 10, in which said first and second switch means each comprise a respective pair of silicon controlled rectifiers connected in inverse parallel relationship wherein each of said rectifiers has an anode, a cathode and a gate electrode.

12. A control apparatus as in claim 11, in which said condition responsive means comprises signal generating means for applying a signal between the cathode and gate electrodes of said pair of silicon controlled rectifiers comprising said second switch means to render said rectifiers conductive, said signal generating means including sensing means responsive to the occurrence of said preselected condition for applying a signal between the cathode and gate electrodes of said pair of silicon controlled rectifiers comprising said second switch means to render said rectifiers nonconductive.

13. A control apparatus as in claim 12, in which said sensing means comprises a thermal device having an impedance which drops rapidly at a preselected temperature, and said preselected event corresponds to said preselected temperature.

14. A control apparatus as in claim 11, in which said control means comprises a silicon controlled rectifier having an anode, a cathode and a gate electrode; said biasing signal means comprising first means for generating a triggering signal to render said control means rectifier conductive, and a switch normally disconnecting said first means from said control means silicon controlled rectifier and being manually operable to connect said first means with said control means silicon controlled rectifier.